United States Patent [19]

Fisher et al.

[11] Patent Number: 5,504,151
[45] Date of Patent: Apr. 2, 1996

[54] ENHANCERS FOR THERMOPLASTIC LOW PROFILE ADDITIVES

[75] Inventors: Dennis H. Fisher, Westerville; Timothy A. Tufts, Delaware, both of Ohio; C. Timothy Moss, Kirkland, Wash.

[73] Assignee: Ashland Inc., Russell, Ky.

[21] Appl. No.: 334,546

[22] Filed: Nov. 8, 1994

Related U.S. Application Data

[63] Continuation-in-part of Ser. No. 151,099, Nov. 12, 1993, abandoned.

[51] Int. Cl.$^6$ ................................................. C08G 63/52
[52] U.S. Cl. ................................. 525/49; 525/28; 525/31; 525/32; 525/43; 525/44; 525/48; 525/111; 525/111.5; 525/112; 525/119; 525/122; 525/126; 525/127; 525/130; 525/131; 525/133.5; 525/139; 525/143; 525/145; 525/149; 525/166; 525/167.5; 525/170; 525/171

[58] Field of Search .................... 525/43, 49, 28, 525/31, 32, 44, 48, 111, 111.5, 112, 119, 122, 126, 127, 130, 131, 133.5, 139, 143, 145, 149, 166, 167.5, 170, 171

[56] References Cited

U.S. PATENT DOCUMENTS 4,555,534  11/1985  Atkins ........................................ 523/507
5,100,935   3/1992  Iselor et al. ............................... 523/514

*Primary Examiner*—Ana L. Carrillo
*Attorney, Agent, or Firm*—Mary E. Picken

[57] ABSTRACT

This invention is the polycapped oligomer adduct of a long chain fatty acid with a multi hydroxy functional or multi epoxy functional compound. This polycapped oligomer is useful in resin compositions to enhance the performance of thermoplastic low profile additives which improve the surface quality of molded composites such as automotive body panels.

26 Claims, 1 Drawing Sheet

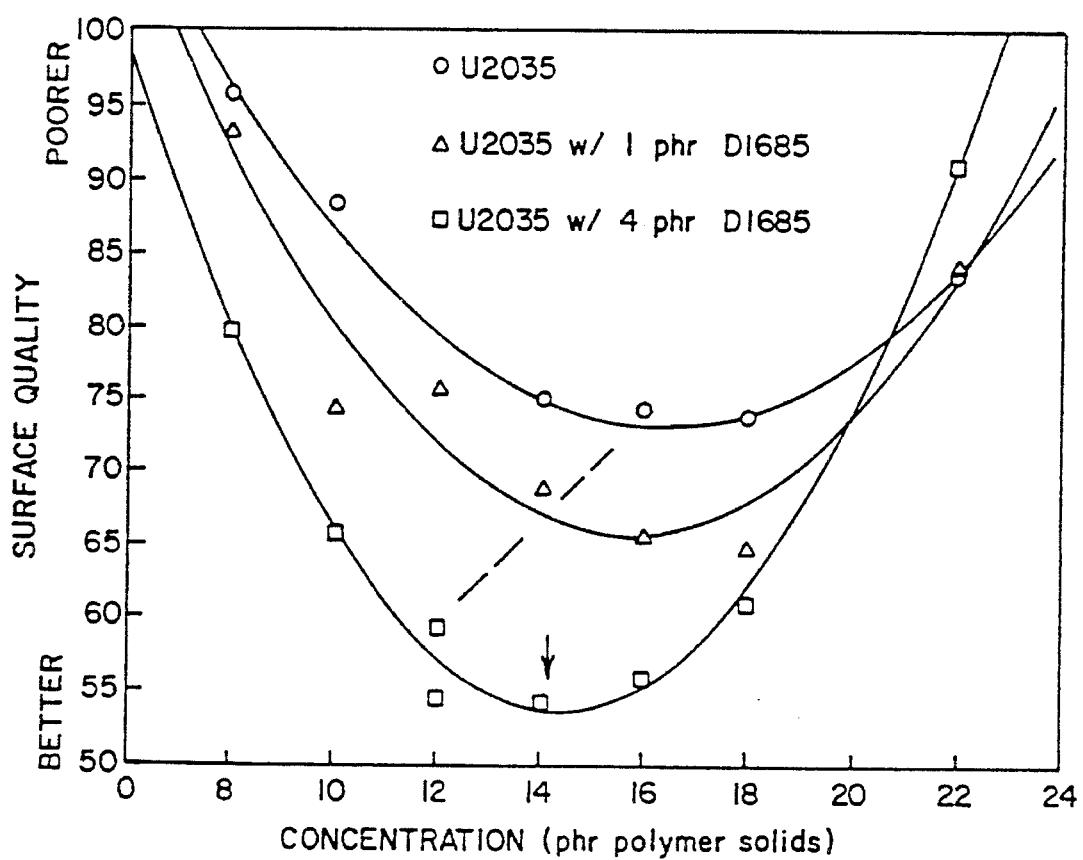

ENHANCERS FOR THERMOPLASTIC LOW PROFILE ADDITIVES

This is a continuation-in-part application Ser. No. 08/151,099 filed on Nov. 12, 1993, now abandoned.

BACKGROUND OF THE INVENTION

Use of plastic materials, such as fiberglass-reinforced thermosetting polyester resins for exterior car parts, has steadily increased. These cured resin systems have been successful because they are strong, heat resistant and make it possible to form one plastic part instead of several metal parts. They are relatively brittle, however, and as consumers demand better quality; surface finish smoothness and dimensional stability must be improved.

A number of products are used to improve surface quality of plastic parts. These are called low profile additives (LPA's) because they decrease surface roughness and improve surface smoothness or "profile". When a surface is rough, a cross section under high magnification shows peaks and valleys. When the surface is smoother, the cross section is smoother, having lower peaks and shallower valleys. An effective LPA reduces the difference between the highest peak and shallowest valley. Even the best LPA's do not achieve a mirror-like surface.

Various oligomers of polypropylene glycol (PPG), polyethylene glycol (PEG), ε-caprolactone, and polyesters of PPG and diacids have been used to improve the effectiveness of LPA's. However, these products tend to cause a significant drop in Barcol hardness and physical properties of the cured resin systems. Other problems caused by the use of hydroxy terminated polyol and polyester oligomers in sheet molding compound (SMC) may include "smoking" caused by an increase in volatiles released when the mold is opened. Systems formulated and stored before use may also experience loss of effectiveness through promotion of transesterification and incorporation of the additive into the base resin. It would be beneficial to identify materials without these drawbacks which would improve the efficiency of low profile additives and provide a better class "A" surface.

Polyol and polyester oligomers capped with fatty acids such as stearic, lauric and tall oil were found to be more effective than the uncapped oligomers. The fatty acid capped materials also proved to be excellent wetting agents giving improved solids dispersion, viscosity and flow. The fatty acid capped oligomers also improved release and surface gloss of the molded part. Unexpectedly, the capping also appears to eliminate the "smoking" sometimes seen when molding SMC and significantly reduces transesterification, thus prolonging the effectiveness of the additive in systems stored after being formulated.

Certain low profile additive enhancers which were compatible in the cured resin were found to have a significant negative impact on Barcol hardness and physical properties and also appeared to retard cure in low pressure molding compound (LPMC). Low pressure molding compound is formulated from a crystalline unsaturated base resin, low profile additive and reactive unsaturated monomer along with inhibitors, cure initiators and filler. The LPMC formulation is liquid above 120° F. but on cooling below 90° F. the base resin crystallizes, and the formulation solidifies, reaching viscosities in excess of 50 million centipoise. LPMC sheet is prepared like sheet molding compound but contains only enough glass to allow handling (2–6 weight percent). Cut pieces of sheet are placed atop a fiberglass preform in a mold at about 90° C. (194° F.). When the mold is closed, the crystalline resin melts and the now liquid filled resin flows and fills the mold cavity under very low pressures, curing to a finished part in 5 to 10 minutes.

Data on the cured thermoset matrix suggested that negative effects on physical properties in LPMC were caused by a plasticizing of the matrix by the soluble additives. Theorizing that additives which are not compatible with the cured matrix would not have such a plasticizing effect and would result in better physical properties, other oligomers were identified which, when capped with a variety of fatty acids, form a separate phase within the matrix during cure. These fatty acid capped oligomers or adducts are incompatible with the curing unsaturated polyester and monomer as are low profile additives. Evaluations showed that most polycapped oligomers were effective as surface quality enhancers, were incompatible in the cured thermoset, and typically showed little negative impact on physical properties and Barcol hardness.

It has been found that effective low profile additive enhancing polycapped oligomers, not compatible with the cured thermoset matrix, can be prepared from many types of oligomers capped with fatty acids. Because these compounds form a separate phase during cure, any negative effect on physical properties and Barcol hardness is greatly reduced. In addition, such additives are efficient wetting agents which reduce processing viscosity of the filled resin and improve filler dispersion, flow, surface gloss and mold release.

THE DRAWING

The drawing is a graph of surface quality of molded plaques according to the numerical index described in U.S. Pat. No. 4,853,777. The lower the index number, the better or smoother the surface. Sheet steel has an 70–90 index. Plate glass has a 15–25 index. Molded composite exterior automotive body panels should have a 50–70 index. The concentration of low profile additive and enhancer is given in parts per hundred parts resin for three molding formulations containing unsaturated polyester resin, low profile additive, reactive monomer and polycapped oligomer enhancer. The graph records surface quality for various levels of low profile additive in the presence of zero parts of the enhancer of this invention (circles), one part of the polycapped oligomer enhancer of this invention (triangles), and four parts of the polycapped oligomer enhancer of this invention (squares).

DETAILED DESCRIPTION OF THE INVENTION

This invention is the use of polycapped oligomer enhancer, incompatible in the cured matrix of polyester thermoset molding compositions, to improve the efficiency of low profile additives and improve shrink control and surface quality of such molding compositions. Examples of such polycapped oligomer enhancers are low molecular weight polyester oligomers based on terephthalic, isophthalic and other dicarboxylic acids reacted with glycols such as ethylene, diethylene, 1.4-butanediol and capped with a fatty acid, having eight to twenty two carbon atoms such as tall oil fatty acid, lauric acid, stearic acid or oleic acid.

Such capped oligomers do not behave as effective low profile additives when used alone, but they do significantly increase the efficiency of typical low profile additives. Since they are not soluble (compatible) in the cured thermoset matrix and form a separate phase during the curing reaction, the loss of physical properties and Barcol hardness which is typically seen when compatible additives plasticize the thermoset matrix is significantly reduced or eliminated. The fatty acid end groups also make this additive a very efficient wetting agent, reducing processing viscosity and improving solids dispersion, gloss, mold release, and resin flow. Evaluation of molded parts has also shown that replacing a portion of the low profile additive with the polycapped oligomer enhancer yields equal or superior surface quality and, simultaneously, a significant increase in physical properties such as tensile strength and flexural strength. These enhancers also lower water absorption of the cured parts.

Reference to the drawing clearly shows the effect of one or four parts enhancer on a urethane linked polyester polyol low profile additive in SMC. The graphed data with zero enhancer (circles) shows that the best surface quality of about 75 is attained at 16 phr of low profile additive. Adding one part enhancer improves the surface quality from about 75 to 65 and adding four parts enhancer further improves the surface quality to about 55 (single arrow).

Study of the diagonal dashed line in the drawing reveals a practical application of this invention. This shows that the user can reduce the low profile additive from 16 parts to 14 parts by adding 1 part polycapped oligomer enhancer and reach an improved surface quality of 68 while increasing physical characteristics, such as tensile strength. Similarly, a better combination of surface quality and improved physicals is obtained by dropping to 12 parts low profile additive and adding 4 parts enhancer which yields a 60 surface quality and improved tensile strength.

The first ingredient of the polyester resin system in which the polycapped oligomer of this invention is used is an unsaturated polyester resin. These are typically made by reacting unsaturated acids or anhydrides with polyhydric alcohols, using methods and reactants well known to those skilled in the art of polyester technology. See, for example, Kirk-Othmer, *Encyclopedia of Chemical Technology*, Third Edition, Volume 18, pages 575– 580 (1982), the entire disclosure of which is incorporated herein by reference. Typical reactants include maleic acid, fumaric acid, aconitic acid, mesaconic acid, maleic anhydride, itaconic anhydride, citraconic anhydride, mixtures thereof, and the like, and glycols, such as ethylene glycol, diethylene glycol, triethylene glycol, polyethylene glycol, propylene glycol, dipropylene glycol, polypropylene glycol, 1,3-butanediol, 1,4-butanediol, neopentyl glycol, cyclohexanedimethanol, 2,2,4-trimethylpentanediol, ethoxylated and/or propoxylated, bisphenol A, trimethylolethane, hydrogenated bisphenol A, trimethylolpropane, dicyclopentadiene glcyol, dibromoneopentyl glycol, mixtures thereof, and the like. Under some circumstances, the polyester resins may further contain, as co-condensed units, other compounds, such as dibasic aromatic acids and anhydrides and saturated aliphatic dibasic acids, which act as modifiers. Illustrative such compounds include phthalic anhydride, isophthalic acid, adipic acid, succinic acid, azelaic acid, sebacic acid, etc. as well as terephthalic acid, various hydrogenated phthalic anhydride derivatives, trimellitic anhydride, cyclohexane-dicarboxylic acid, the anhydrides of chlorendic, tetrabromophthalic and tetrachlorophthalic acids, and so forth. Both amorphous and crystalline unsaturated polyester resins and mixtures thereof are used with the polycapped oligomer enhancer of this invention.

The second ingredient of the resin composition, in which the polycapped oligomer of this invention is used, is a thermoplastic additive for improving the surface quality of molded articles. These are commonly referred to as low profile additives (LPAs). One such additive is the URALLOY hybrid polymer low profile additive available from Ashland Chemical Company, Division of Ashland Oil, Inc., the polyurethane oligomer reaction product of an isocyanate-terminated prepolymer and an polyester polyol described in U.S. Pat. No. 4,421,894 which is expressly incorporated herein by reference. Other low profile additives, similarly useful with the additive of this invention, include polyvinylacetate polymers and copolymers, polyacrylates. polymethacrylates, and copolymers such as polymethylmethacrylate, polymethylacrylate, polybutylacrylate, and saturated polyesters prepared from dibasic acids or anhydrides such as succinic, adipic, sebacic, phthalic, isophthalic, terephthalic, trimellitic, and the like reacted with glycols such as ethylene glycol, diethylene glycol, propylene glycol, dipropylene glycol, neopentyl glycol, glycols of polyethylene oxide glycol, glycols of polypropylene oxide, butanediol, cyclohexane dimethanol and the like. Also included are various styrene polymers and co-polymers such as polystyrene-butadiene, etc.

The third ingredient of the resin composition is the polycapped oligomer of this invention. The polycapped oligomer is prepared by reacting polyfunctional oligomers with 2 or more fatty acids. Examples of polyfunctional oligomers that can be used include polyols of the formulas:

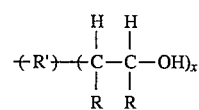   I or

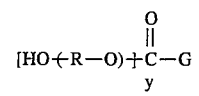   II where $x \geq 2$ where R groups may be hydrogen or alkyl, and R' is the ethylene oxide and/or propylene oxide adduct of bisphenol A, the ethylene oxide and/or propylene oxide adduct of phenol formaldehyde resins, and cellulosics and/or their ethylene oxide or propylene oxide adducts. Oligomers of structure II may also be used as the polyol portion of these additives, where R may be alkyl, cycloalkyl, or aryl and G is a multifunctional group ($y \geq 2$) which may contain alkyl, aryl, ether, polyether, ester, polyester, urethane or polyurethane, bonds. Also useful are similar moieties which are polyfunctional epoxides which form polycapped oligomers by the nucleophilic addition of epoxides and acids yielding beta hydroxy esters. In addition, any of the various alkyd resins are also useful in this invention. Alkyd resins are well known in the art, see for example Kirk-Othmer, 3rd edition, vol. 2, p. 18. Generally the number average molecular weight of such oligomers is low, preferably it is less than 2000. The oligomers are typically saturated compounds, however some degree of unsaturation is permitted so long as the specific unsaturation has a low rate of reactivity with styrene. The two or more functional sites of the oligomers are easily connected to long chain fatty acids having 8 to 22 carbon atoms.

Useful C8 to C22 monofunctional acids for reaction with the polyfunctional oligomer include: lauric, linoleic, linolenic, oleostearic, stearic, ricinoleic, undecylic (undecanoic), margaric, crucic, palmitoleic, elaidic, capryliic (octanoic), 2-ethyl hexanoic, nonanoic, capric (decanoic), oleic, myristic, palmitic, arachidic, behenic, vernolic, tall oil fatty acid, and their mixtures. Lauric acid, stearic, and tall oil fatty acid are the preferred acids.

The fourth ingredient of the resin system is one or more olefinically unsaturated monomers which copolymerize with the unsaturated polyester ingredient. Useful monomers include styrene, methyl methacrylate, divinyl benzene, alpha-methyl styrene, vinyl acetate, various alkyl acrylates and methacrylates, and the like. The most frequently used and preferred monomer is styrene.

Additional optional ingredients include mold releases such as zinc stearate and calcium stearate, fillers such as calcium carbonate, fly ash, wood flour, mica, glass or ceramic beads, cure accelerators such as organic cobalt compounds, cure initiators such as peroxyesters, dialkyl peroxides, alkyl aryl peroxides, diaryl peroxides, peroxy ketals and ketone peroxides. Inhibitors such as butyl hydroxy toluene (BHT), parabenzoquinone (PBQ), hydroquinone (HQ), tetrahydroquinone (THQ), are also optional ingredients. In addition, some molding compositions such as sheet molding compound (SMC) or bulk molding compound (BMC) must be "thickened" to facilitate handling after mixing the glass reinforcement with the filled polyester resin formulation. This thickening is usually done by mixing in a "B-side" which contains a mineral base such as magnesium or calcium oxide and or hydroxide. The residual carboxylic acid ends on the polymers in the resin composition react with the base and tie the chain together with an ionic bond. This introduces the required thickening by increasing the molecular weight of the polymer and thus its "apparent viscosity". Other thickening mechanisms such as polymer crystallization or urethane bond formation can also be used.

In the following examples all parts are by weight and in the metric system unless otherwise specified. All references cited herein are hereby incorporated by reference.

Examples A, B, C, D, E & F describe the preparation of various polycapped oligomer enhancers of the invention which enhance the performance of thermoplastic low profile additives in sheet molding compound (SMC), bulk molding compound (BMC), and low pressure molding compound (LPMC).

Example A

Enhancer adduct (used in Examples 3, 4 and 5) was prepared from recycled scrap polyethylene terephthalate digested by transesterification with diethylene glycol to a number average molecular weight of about 400 at 225° to 240° C. The product had hydroxyl chain ends which were then capped with tall oil fatty acid. Polyethylene terephthalate in the amount of 2710 grams and 1210 g diethylene glycol were heated to 240° C. in a glass resin kettle and held for 3.5 hours. The product was soluble in 50% propylene glycol monomethylether acetate. The hydroxyl value was between 320 and 330, the number average molecular weight was 170 to 175 per hydroxyl group. Tall oil fatty acid in the amount of 6080 grams was added and the mixture heated to 215° C. with a nitrogen sparge and held until the acid value was reduced to 4 to 8. The product was an oily semi-liquid with a viscosity of 3000–3500 centipoise and was used at 100% non-volatiles.

Example B, E, and F

Enhancer adduct B (used in Examples 6 and 9) was a hydroxyl terminated oligomer of adipic acid and diethylene glycol capped on both ends with tall oil fatty acid. Adipic acid in the amount of 1828 grams and 1772 g diethylene glycol were charged into a 4-liter glass resin kettle. Under nitrogen sparge, the temperature was slowly increased to 210° while removing approximately 450 grams water. When the acid value was reduced below 1, the hydroxyl value was 135–140. Tall oil fatty acid (613 g) and 887 g of the oligomer product were charged to a 2-liter glass resin kettle. The mixture was slowly heated to 210° while removing water until the acid value was between 4 and 8. The polycapped oligomer enhancer product was an oily liquid having a viscosity of about 700 centipoise and was used at 100% non-volatiles. Other additives have been prepared in a similar manner, such as the lauric acid adduct oligomer prepared from an adipic acid and cyclohexane dimethanol oligomer (Adduct E) and the tall oil fatty acid adduct from the cyclohexane dimethanol oligomer (Adduct F).

Example C

Enhancer adduct C (used in Example 1, 2 and 3) was made from the reaction product of Bisphenol A with ethylene oxide and propylene oxide (SYNFAC®8026 available from Milliken Chemical Co.) and capped with stearic fatty acid. Stearic acid in the amount of 449 grams and 222 grams SYNFAC®8026 ethoxylated/propoxylated bisphenol A were charged to a 1-liter glass resin kettle along with 0.07 g FASCAT® 4100 monohydrated butyl tin oxide polymerization catalyst (M&T Chemicals). The mixture was heated to 200° C. with good mixing. The ester product was a crystalline solid and was dissolved in styrene for use in Examples 1, 2, and 3 at 75% non-volatiles.

Example D, E and F

Enhancer adduct D was made from a multifunctional epoxy compound and tall oil fatty acid. Tall oil fatty acid in the amount of 594 grams and 394 grams of Epon 828 bisepoxide resin (Shell Chemical) were charged to a 1-liter glass resin kettle. About 2.4 g of Aerojet Accelerator AMC-2 cobalt complex catalyst (Aerojet Chemical Operations, Sacramento, Calif.) was charged. The mixture was heated to 150° C. with good mixing for 1½ to 2 hours. The beta hydroxy ester product was used in Example 3 at 100% non-volatiles.

Example G

Crystalline Base Resins

Several crystalline base resins were prepared and used in certain examples. These were prepared from fumaric acid (FA) and neopentyl glycol (NPG) modified with propylene glycol (PG) or blends of propylene glycol (PG) and ethylene glycol (EG). Using a 6 to 10 percent molar excess of glycols, the reactants were heated between 140° C. and 195° C. and water was removed until the acid value in milligrams of KOH per gram of sample was 28–32. The unsaturated polyester resins formed were then cut to 65% non-volatiles in inhibited styrene.

EXAMPLES

In the following Example 1, enhancers were added to a system containing the AROPOL Q8000 saturated polyester low profile additive, sold by Ashland Chemical Company, Divison of Ashland Oil, Inc., Columbus, Ohio.

EXAMPLE 1

| Component | Form. #1 (phr) | Form. #2 (phr) | Form. #3 (phr) | Form. #4 (phr) |
|---|---|---|---|---|
| Crystalline Base Resin[1] | 74.0 | 75.5 | 75.5 | 77.0 |
| Q8000 urethane linked saturated polyester low profile additive | 20.0 | 18.0 | 18.0 | 16.0 |
| Styrene | 4.0 | 1.5 | 0.5 | 1.0 |
| Methyl methacrylate | 2.0 | 2.0 | 2.0 | 2.0 |
| Butyl hydroxy toluene (BHT) | 0.08 | 0.08 | 0.08 | 0.08 |
| VDI cobalt accelerator[2] | 0.1 | 0.1 | 0.1 | 0.1 |
| calcium carbonate filler | 150.0 | 150.0 | 150.0 | 150.0 |
| Perkadox 16 peroxy initiator[3] | 0.5 | 0.5 | 0.5 | 0.5 |
| L-256 peroxy initiator[4] | 1.5 | 1.5 | 15 | 1.5 |
| Ethox ® DL-14[5] compatible additive | — | 3.0 | — | — |
| Incompatible Enhancer Adduct C[6] | — | — | 4.0 | 4.0 |
| Barcol Hardness | 34.8 | 26.3 | 31.8 | 36.2 |
| Matrix change mils/inch | −1.0 shrinkage | −0.3 shrinkage | +0.5 expansion | 0.0 no change |

[1] crystalline resin prepared from fumaric acid/neopentyl glycol/propylene glycol in a 100/60/40 molar ratio. Acid value 28 to 32, 65% non-volatiles in styrene
[2] A cobalt-organic acid salt (12% metal) available from Mooney Chemicals
[3] Available from Akzo America, Inc.
[4] Available from Alochem North America, Inc.
[5] polyethylene glycol dilaurate, EO segment Mn 600, available from Ethox Chemicals, Inc.
[6] distearate capped oligomer prepared as described in Example C In formulations 3 and 4, where less LPA is used than in formulation 1, use of the incompatible enhancer adduct C minimizes the reduction of Barcol Hardness (seen with the compatible material in formulation 2) and demonstrates improved shrink control. Formulations 2, containing the compatible enhancer Ethox DL-14 surfactant improves shrink control but deleteriously lowers Barcol Hardness by about 23%.

In the following Example 2. the incompatible enhancer adduct C of this invention is used in a low profile molding compound containing crystalline base resin, Uralloy® hybrid resin LPNT low profile additive sold by Ashland Chemical Inc. and dicyclopentadiene amorphous base resin.

EXAMPLE 2

| | Formulation #1 (phr) | Formulation #2 (phr) |
|---|---|---|
| Crystalline[1] Base Resin | 71.0 | 72.5 |
| Uralloy LPNT Hybrid Resin low profile[2] additive | 25.0 | 17.5 |
| ADDUCT C[3] | — | 4.0 |
| DCPD amorphous base resin[4] | 2.0 | 2.0 |
| Methyl methacrylate | 2.0 | 2.0 |
| Butyl hydroxy toluene (BHT) | 0.08 | 0.08 |
| calcium carbonate filler | 150.0 | 150.0 |
| Perkadox 16 peroxy initiator | 0.5 | 0.5 |
| L-256 peroxy initiator | 1.5 | 1.5 |
| Barcol Hardness | 14.7 | 35.8 |
| Matrix Shrinkage mils/inch | −0.4 | −0.4 |

[1] same resin as in footnote 1 Example 1
[2] polyurethane LPA sold by Ashland Chemical, 40% non-volatiles in styrene
[3] stearic acid dicapped ethoxylated propoxylated bisphenol A incompatible enhancer prepared as described in Example C
[4] AROPOL 8014 product of Ashland Chemical, Inc.: 72–75% nonvolatiles in styrene, acid value 18–35, stokes viscosity 10–12

In formulation #2, use of the incompatible enhancer allows the Barcol hardness to be dramatically improved while shrinkage control is maintained. The effectiveness of a polycapped oligomer enhancer of this invention used with a urethane oligomer low profile additive is thus demonstrated.

In Example 3, three polycapped oligomer enhancers of this invention are used in a low pressure molding compound (LPMC) system containing crystalline base resin al 65% non-volatiles, Q8000 low profile additive sold by Ashland Chemical and AROPOL 8014 dicyclopentadiene (DCPD) modified base resin sold by Ashland Chemical which is molded at 94° F. (90° C.).

EXAMPLE 3

| Component | Form. #1 (phr) | Form. #2 (phr) | Form. #3 (phr) | Form. #4 (phr) |
|---|---|---|---|---|
| Crystalline Base Resin[1] | 73.0 | 73.0 | 73.0 | 76.0 |
| Q8000 saturated polyester low profile additive | 17.0 | 17.0 | 17.0 | 20.0 |
| ADDUCT C[2] | 4.0 | — | — | — |
| ADDUCT D[3] | — | 3.0 | — | — |
| ADDUCT A[4] | — | — | 3.0 | — |
| DCPD amorphous base resin[5] | 2.0 | 2.0 | 2.0 | 0 |
| Styrene | 2.0 | 3.0 | 2.0 | — |
| Methyl methacrylate | 2.0 | 2.0 | 2.0 | 2.0 |
| Butyl hydroxy toluene | 0.08 | 0.08 | 0.08 | 0.08 |
| calcium carbonate filler | 150.0 | 150.0 | 150.0 | 150.0 |
| Perkadox peroxy initiator | 0.5 | 0.5 | 0.5 | 0.5 |
| L-256 peroxy initiator | 1.5 | 1.5 | 1.5 | 1.5 |
| Barcol Hardness | 39.4 | 40.1 | 41.4 | 42.0 |
| Change (mils/in) | 0 none | −0.5 shrinkage | +0.4 expansion | −0.5 shrinkage |

[1] crystalline resin prepared from fumaric acid/neopentyl glycol/propylene glycol/ethylene glycol in a 100/60/30/10 molar ratio. Acid value 28 to 32, used at 65% non-volatiles in styrene.
[2] distearate capped oligomer enhancer prepared as described in Example C
[3] ditallate capped oligomer enhancer prepared as described in Example D
[4] ditallate capped oligomer enhancer prepared as described in Example A
[5] AROPOL 8014

Formulations 1, 2 and 3 contain less saturated polyester LPA than formulation 4. Three different enhancers, replacing part of the saturated polyester LPA, provide the same hardness with equal or improved shrinkage control.

Example 5 shows the response of a crystalline base resin formulated with Ashland Chemical's Q8000 saturated poly-

EXAMPLE 4

| Component | Form. #1 (phr) | Form. #2 (phr) | Form. #3 (phr) | Form. #4 (phr) | Form. #5 (phr) | Form. #6 (phr) |
|---|---|---|---|---|---|---|
| Crystalline Base Resin[1] | 76.0 | 76.0 | 76.0 | 76.0 | 76.0 | 76.0 |
| Q8000 low profile additive | — | — | — | 17.0 | 17.0 | 17.0 |
| ADDUCT A[2] | 10.0 | — | — | 3.5 | — | — |
| ADDUCT E[3] | — | 10.0 | — | — | 3.5 | — |
| ADDUCT F[4] | — | — | 10.0 | — | — | 3.5 |
| Styrene | 12.0 | 12.0 | 12.0 | 2.0 | 2.0 | 2.0 |
| Methyl methacrylate | 2 | 2 | 2 | | | |
| Butyl hydroxy toluene | 0.8 | 0.8 | 0.8 | 0.8 | 0.8 | 0.8 |
| Mold Release[5] | 1.0 | 1.0 | 1.0 | 1.0 | 1.0 | 1.0 |
| $CaCO_3$ Filler | 150 | 150 | 150 | 150 | 150 | 150 |
| Perkadox 16 | 0.5 | 0.5 | 0.5 | 0.5 | 0.5 | 0.5 |
| L-256 | 1.5 | 1.5 | 1.5 | 1.5 | 1.5 | 1.5 |

| Formulation | Barcol Hardness | Matrix Shrinkage (mils/in) | Comments |
|---|---|---|---|
| 1 | 45.5 | −17.6 | Poor non-uniform phase out, white blotches of material visible in plaque matrix. |
| 2 | 50.2 | −12.0 | Poor non-uniform phase out, white blotches of material visible in plaque matrix. |
| 3 | 48.0 | −10.2 | Poor non-uniform phase out, white blotches of material visible in plaque matrix. |
| 4 | 37.3 | −0.5 | White, glossy, uniform phase out. |
| 5 | 43.2 | −1.5 | Off-white, uniform phase out. |
| 6 | 35.0 | −0.9 | White, uniform phase out. |

[1]crystalline resin prepared from fumaric acid/neopentyl glycol/propylene glycol/ethylene glycol in a 100/60/30/10 molar ratio. Acid value 28 to 32, used at 65 non-volatiles in styrene.
[2]ditallate capped oligomer prepared in Example A
[3]dilaurate capped oligomer prepared in Example E
[4]ditallate oligomer prepared in Example F
[5]Specialty 102 from Specialty Products Co.

Formulations 1, 2 and 3 contain only the enhancing adducts and demonstrate gross shrinkage which shows that the adducts are not low profile additives when used alone. Formulations 4, 5 and 6, containing enhancing adducts A, E and F respectively, and Q8000 saturated polyester LPA, show excellent shrinkage control.

ester low profile additive to capped oligomer enhancers having no termination, mono- and di-fatty acid termination.

EXAMPLE 5

| Component | Form. #1 (phr) | Form. #2 (phr) | Form. #3 (phr) | Form. #4 (phr) | Form. #5 (phr) | Form. #6 (phr) | Form. #7 (phr) |
|---|---|---|---|---|---|---|---|
| Crystalline Base Resin[1] | 73.0 | 73.0 | 73.0 | 73.0 | 73.0 | 73.0 | 73.0 |
| AROPOL Q8000 LPA[2] | 17.0 | 17.0 | 17.0 | 17.0 | 17.0 | 17.0 | 17.0 |
| Styrene | 4.5 | 4.5 | 4.5 | 4.5 | 4.5 | 4.5 | 5.0 |
| Methyl methacrylate | 2.0 | 2.0 | 2.0 | 2.0 | 2.0 | 2.0 | 2.0 |
| ADDUCT A[3] | 3.5 | — | — | — | — | — | — |
| E400-Polyethylene Glycol[4] | — | 3.5 | — | — | — | — | — |
| Ethox ML-14[5] | — | — | 3.5 | — | — | — | — |
| Ethox DL-14[6] | — | — | — | 3.5 | — | — | — |
| Ethox TO-16[7] | — | — | — | — | 3.5 | — | — |
| Ethox DTO-14[8] | — | — | — | — | — | 3.5 | — |
| calcium carbonate filler | 150.0 | 150.0 | 150.0 | 150.0 | 150.0 | 150.0 | 150 |
| Perkadox 16 peroxy initiator | 0.5 | 0.5 | 0.5 | 0.5 | 0.5 | 0.5 | 0.5 |
| L-256 peroxy initiator | 1.5 | 1.5 | 1.5 | 1.5 | 1.5 | 1.5 | 1.5 |
| Barcol Hardness | 26 | 28 | 19 | 26.3 | 27.3 | 24.0 | 33.5 |
| Matrix Shrinkage (mils/in) | +0.7 | −0.8 | −0.3 | +0.07 | −0.1 | +0.7 | −2.1 |

[1]same base resin as Example 3
[2]saturated polyester low profile additive at 50% nonvolatiles, Ashland Chemical, Inc.
[3]ditallate capped oligomer prepared In Example A
[4]400 molecular weight polyethylene glycol, available from Dow Chemical Co.
[5]available from Ethox Chemicals, Inc. polyethylene glycol monolaurate (EO segment about 600 number average molecular weight (Mn)) compatible additive -continued

| | EXAMPLE 5 | | | | | | |
|---|---|---|---|---|---|---|---|
| Component | Form. #1 (phr) | Form. #2 (phr) | Form. #3 (phr) | Form. #4 (phr) | Form. #5 (phr) | Form. #6 (phr) | Form. #7 (phr) |

[6] available from Ethox Chemicals, Inc., polyethylene gwcol dilaurate (EO segment Mn about 600) compatible additive
[7] available from Ethox Chemicals, Inc., polyethylene glycol monotallate (EO segment Mn about 600) compatible additive
[8] available from Ethox Chemicals, Inc., polyethylene glycol ditallate (EO segment Mn about 600) incompatible additive Note that the additives ML-14, DL-14, DTO-16 and TO-14 all have a center segment of polyethylene glycol. This example shows that monocapping the additive with tall oil fatty acid gives less shrinkage than no capping, dicapping gives expansion instead of shrinkage. Also note that ADDUCT A is dicapped with tall oil fatty acid.

Example 6 describes SMC formulations containing an amorphous unsaturated polyester base resin, three different low profile additives and enhancer adduct B.

| | EXAMPLE 6 | | | | | |
|---|---|---|---|---|---|---|
| Components | 1 | 2 | 3 | 4 | 5 | 6 |
| AROPOL Q6585[1] | 65.0 | 69.0 | 59.0 | 71.1 | 60.0 | 60.0 |
| Polyvinyl Acetate LPA (40% NV) | 35.0 | 25.0 | — | — | — | — |
| Polymethyl Methacrylate LPA (31.5% NV) | — | — | 41.0 | 23.7 | — | — |
| Uralloy ® hybrid resin 2035 LPA (40% NV) | — | — | — | — | 40.0 | 30.0 |
| Adduct B | — | 4.0 | — | 3.9 | — | 4.0 |
| Styrene | 0 | 2.0 | — | — | — | 6.0 |
| Tall oil fatty acid | 1.0 | — | 1.0 | — | 0.5 | — |
| VDI cobalt accelerator | 0.1 | 0.1 | 0.1 | 0.1 | 0.1 | 0.1 |
| Butyl hydroxytoluene | 0.1 | 0.1 | 0.1 | 0.1 | 0.1 | 0.1 |
| Tert-butyl peroxy benzoate | 1.5 | 1.5 | 1.5 | 1.5 | 1.5 | 1.5 |
| Filler | 180.0 | 180.0 | 150.0 | 150.0 | 200.0 | 200.0 |
| Zinc stearate | 4.5 | 4.5 | 5.5 | 5.5 | 4.5 | 4.5 |
| MgO[2] thickener | 2.3 | 2.5 | 2.5 | 2.7 | 3.9 | 3.9 |
| Ashland Index of Surface Quality | 87 | 65 | 116 | 107 | 74 | 57 |

[1] amorphous unsaturated polyester resin (propylene glycol and maleic acid), acid value 28 to 32, 65% non-volatiles in styrene, available from Ashland Chemical Company
[2] A 33% dispersion of MgO in a low AV unsaturated polyester Example 6 shows the efficiency of enhancer adduct B of this invention in SMC formulations using three different low profile additives and an amorphous unsaturated polyester resin system.

Example 7 uses a multi-functional polyol produced from the glycolysis reaction between diethylene glycol and cured unsaturated polyester resin capped with two to six tall oil fatty acid molecules and having various amounts of unsaturation from maleic anhydride.

Cured polyester-styrene copolymer from sheet molding compound was reacted with diethylene glycol. Excess glycol was stripped from the product until the hydroxyl number was about 505, implying a hydroxyl equivalent weight of 111. One equivalent of glycol and one equivalent of tall oil fatty acid were then combined in a reaction flask with 0.1 weight percent Fascat 4100 catalyst (hydrated monobutyltinoxide from M&T Chemicals). The mixture was reacted at 190° C.–210° C. for about 6.5 hours and had a final acid value of 4.6. This product was designated adduct GP-1.

Adduct GP-2 was prepared from stripped glycolysis product having a hydroxyl value of 399 (equivalent weight of 141). One equivalent of this polyol was charged to a reaction flask with ⅔ equivalent weight of tall oil fatty acid (equivalent weight 286), ⅓ equivalent weight of the reaction product of maleic anhydride and dicyclopentadiene (equivalent weight 260) which had subsequently been isomerized to the fumarate isomer and 0.1 weight percent Fascat 4100. The mixture was reacted at 190° C.–210° C. for 2–3 hours and had a final acid value of 10.7.

Adducts G P-3 and G P-4 were prepared from stripped glycolysis product with a hydroxyl value of 399 (equivalent weight 141). One equivalent of polyol was reacted with ⅔ equivalent of tall oil fatty acid (equivalent weight 286) and 0.1 weight percent Fascat 4100 at 180° C.–190° C. for about 3.5 hours having a final acid value of 2. One half of the product was set aside and designated GP-3. The remainder, containing about ⅙ mole equivalent of hydroxyls, was reacted with ⅙ mole of maleic anhydride at 120° C.–140° C. for 2.5 hours. The reaction was ended when infrared analysis of the product, showed no residual maleic anhydride.

| EXAMPLE 7 | | | | | |
|---|---|---|---|---|---|
| Enhancing Adduct From Cured Polyester Glycolysis Product | | | | | |
| Component | #1 (phr) | #2 (phr) | #3 (phr) | #4 (phr) | #5 (phr) |
| AROPOL Q6585[1] | 55.0 | 62.0 | 62.0 | 62.0 | 62.0 |
| Uralloy hybrid resin 2035 LPA | 45.0 | 30.0 | 30.0 | 30.0 | 30.0 |
| Styrene | — | 4.0 | 4.0 | 4.0 | 4.0 |
| Adduct GP-1 | — | 4.0 | — | — | — |
| Adduct GP-2 | — | — | 4.0 | — | — |
| Adduct GP-3 | — | — | — | 4.0 | — |
| Adduct GP-4 | — | — | — | — | 4.0 |
| VDI cobalt accelerator | 0.1 | 0.1 | 0.1 | 0.1 | 0.1 |
| Butyl Hydroxy Toluene (Inhibitor) | 0.1 | 0.1 | 0.1 | 0.1 | 0.1 |
| Peroxide Initiator, TBPB | 1.5 | 1.5 | 1.5 | 1.5 | 1.5 |
| $CaCO_3$ Filler | 200.0 | 200.0 | 200.0 | 200.0 | 200 |
| Zinc Stearate (Mold Release) | 4.5 | 4.5 | 4.5 | 4.5 | 4.5 |
| MgO Thickener (33% Dispersion) | 3.9 | 3.9 | 3.9 | 3.9 | 3.9 |
| Ashland Index (LORIA ®) | 71 | 57 | 68 | 60 | 61 |

EXAMPLE 7
Enhancing Adduct From Cured Polyester Glycolysis Product

| Component | #1 (phr) | #2 (phr) | #3 (phr) | #4 (phr) | #5 (phr) |
|---|---|---|---|---|---|

® LORIA is a registered trademark of Ashland Oil, Inc.
[1] amorphous unsaturated polyester resin from propylene glycol and maleic (acid value 28 to 32, 65% non-volatiles in styrene)

Formulations #2 and #4 in Example 7 show the effectiveness of the adducts in URALLOY®2035 low profile additive. Formulation #3 shows that replacing one third of the tall oil fatty acid with highly reactive unsaturated fumarate oligomer significantly reduces the enhancer adduct's effectiveness. Formulation #5, on the other hand, also contains an unsaturated moiety. The maleate double bond, however, is very slow to react with styrene and thus does not reduce the effectiveness of Adduct GP-4.

Example 8 demonstrates the effectiveness of an alkyd resin when used as an enhancer. Alkyd resins are basically fatty acid terminated saturated polyesters. For a description of alkyd resins and their technology, see *Alkyd Resin Technology* by T. C. Patton, Interscience Publishers, 1962, or *Kirk-Othmer Encyclopedia of Chemical Technology*, 4th Ed., vol. 2, p53ff.

An alkyd resin was prepared as follows. Tall oil fatty acid (570 g), pentaerythritol (190 g), and phthalic anhydride (240 g) were charged to a two liter resin kettle and heated with stirring for 1½ hours at 400° F. About 43 ml of water were removed, then the kettle temperature was increased to 480° F. and held for 1 hour. The resulting alkyd had an AV of 3.4. It was cooled to 150° F. and 429 g styrene with 0.3 g parabenzoquinone was stirred into the resin until a brown solution resulted. This solution will be used below and is referred to as alkyd resin solution in composition A.

The following formulations were compounded with 27% by weight 1" chopped OCF 980 fiberglass into SMC sheet to determine the effectiveness of the alkyd as a surface quality enhancer. After reaching suitable molding viscosity (about 15–25 million centipoise), these compounds were molded at 300° F. and 1000 psi for 2 minutes into 12 inch by 12 inch panels approximately 100 mils thick. These panels were then evaluated for surface quality using the Loria Surface Analyzer. The numbers reported in the table are Ashland Index Numbers, with lower numbers indicating better surface quality.

Example 8

| | Formulation A | Formulation B |
|---|---|---|
| Unsaturated polyester[1] | 769 g | 720 g |
| LPA[2] | 334 | 380 |
| Alkyd resin solution | 69 | — |
| Accelerator[3] | 0.6 | 1.2 |
| BHT[4] | 6.0 | 12 |
| Styrene | 60 | — |
| t-Butylperbenzoate | 18 | 18 |
| Zinc stearate | 54 | 54 |
| Ca (CO₃) | 2640 | 2564 |
| B-side[5] | 42 | 32 |
| LORIA[6] | 57 | 80 |

[1] a 65% styrene solution of an unsaturated polyester prepared from propylene glycol and maleic anhydride using a 6–8% glycol excess (AV = 30)
[2] Uralloy 85-05 hybrid resin, a 40% solids styrene solution of a saturated polyester/urethane LPA
[3] A cobalt-organic acid salt, 12% metal
[4] a 10% solution of butylated hydroxytoluene (BHT) in styrene

Example 8 (continued)

| | Formulation A | Formulation B |
|---|---|---|

[5] a 33% MgO dispersion in a low MW, low AV PG/maleate polyester
[6] as measured by the LORIA Surface Analyzer As can be seen in the above example 8, composition A (an example of this invention) has significantly better surface quality compared to composition B which does not contain the enhancer of this invention. This improved surface was observed even when substantially less LPA was used in example which usually results in poorer surface quality.

Example 9 illustrates the use of enhancer Adduct B in SMC formulations containing an unsaturated polyester base resin, reactive monomer and AROPOL Z8000 low profile additive. The formulation containing Adduct B shows improved surface quality (Ashland Index) physical properties and water absorption (ASTM D 570).

EXAMPLE 9

| Components | Formulation 1 | Formulation 2 | Formulation 3 |
|---|---|---|---|
| AROPOL Q6585[1] | 67.5 | 75.0 | 75.0 |
| AROPOL Q8000[2] LPA (50% NV) | 32.5 | 25.0 | 20.0 |
| Adduct B | — | — | 4.0 |
| Styrene | — | — | 1.0 |
| Butyl hydroxy toluene | 0.1 | 0.1 | 0.1 |
| t-butyl peroxybenzoate | 1.5 | 1.5 | 1.5 |
| Filler | 200.0 | 200.0 | 200.0 |
| Zinc stearate | 4.5 | 4.5 | 4.5 |
| MgO thickener[3] | 10.0 | 10.0 | 10.0 |
| Ashland Index (Surface Quality) | 73 | 94 | 66 |
| Tensile Strength (ksi) | 13.29 | 14.29 | 15.08 |
| flexural strength (ksi) | 34.96 | 31.61 | 33.68 |
| 24 hour water absorption (wt. %) | 0.77 | 0.68 | 0.42 |

[1] Amorphous UPE resin (propylene glycol/maleic acid), acid value 28–32, 65% NV in styrene, available from Ashland Chemical Company
[2] Saturated PE low profile additive, 50% NV in styrene, available from Ashland Chemical Company
[3] A 11% dispersion of MgO in a low acid value UPE carrier The following Example 10 provides an illustration of the behavior of the phase-stabilizing agents of U.S. Pat. No. 4,622,354 to Budd Company. The infra-red spectra of two preparations were compared to determine whether admixtures of long chain acids and polyester polyol would react in situ. The infra-red spectrum of the admixture was compared with that of the reaction product of acid and polyester polyol.

EXAMPLE 10

The IR spectrum of the unreacted mixture of polyester polyol and oleic and stearic acids showed the same hydroxyl peak from polyol hydroxyl groups and acid groups at days 1,6 and 10 after mixing. The mixture also showed the same overlapping carbonyl group peaks from acid groups and ester groups at days 1,6 and 10 after mixing. Accordingly, there is no in situ formation of polycapped oligomer adduct. If there had been in situ reaction, the configurations of the $-OH$ and $>c=o$ peaks would have changed due to removal of hydroxyl and acid groups to form the ester.

The IR spectrum of reacted polyester polyol and oleic and stearic acid were compared with the IR spectrum of the unreacted components and showed the disappearance of the $-OH$ peak due to its reaction. The $-cooH$ portion of the overlapping $-cooH$ and $>c=o$ peaks also disappeared leaving the single sharp ester carbonyl peak.

The following Example 11 reports the results of using a mixture of acids, an uncapped oligomer, a mixture of acids with oligomer, and capped oligomer Adduct A. U.S. Pat. No. 4,622,354 uses separately either fatty acid or polyester polyol.

EXAMPLE 11
SURFACE QUALITY COMPARISONS FOR ACIDS,
OLIGOMERS, CAPPED OLIGOMER ADDUCT A

| ADDITIVE (phr) | | ASHLAND INDEX |
|---|---|---|
| CONTROL | #1 | 81 |
| OLEIC/STEARIC (4.5) [50/50] | #2 | 71 |
| PET/DEG OLIGOMER OF ADDUCT A (4.5) | #3 | 78 |
| OLIGOMER/MIXED ACIDS (4.5) [50/50] | #4 | 69 |
| CAPPED OLIGOMER ADDUCT A (4.5) | #5 | 60 |

| | Formulations: | | | | |
|---|---|---|---|---|---|
| Components | #1 (phr) | #2 (phr) | #3 (phr) | #4 (phr) | #5 (phr) |
| AROPOL 6585[1] | 65.5 | 65.5 | 65.5 | 65.5 | 65.5 |
| URALLOY 2035[2] | 30.0 | 30.0 | 30.0 | 30.0 | 30.0 |
| Styrene | 4.5 | 0 | 0 | 0 | 0 |
| Oleic Acid | 0 | 2.3 | 0 | 1.1 | 0 |
| Stearic Acid | 0 | 2.3 | 0 | 1.1 | 0 |
| Uncapped Oligomer of ADDUCT A | 0 | 0 | 4.5 | 2.3 | 0 |
| ADDUCT A | 0 | 0 | 0 | 0 | 4.5 |
| Cobalt Naphthenate (12% Co metal) | 0.1 | 0.1 | 0.1 | 0.1 | 0.1 |
| Tert-Butyl hydroxytoluene | 0.1 | 0.1 | 0.1 | 0.1 | 0.1 |
| Zn Stearate | 4.5 | 4.5 | 4.5 | 4.5 | 4.5 |
| Calcium Carbonate filler | 200.0 | 200.0 | 200.0 | 200.0 | 200.0 |
| Tert-butyl Peroxybenzoate | 1.5 | 1.5 | 1.5 | 1.5 | 1.5 |
| MgO Thickener[3] | 3.5 | 3.5 | 3.5 | 3.5 | 3.5 |

[1]Amorphous unsaturated polyester resin (propylene glycol and maleic acid), acid value 28 to 32, 65% non-volatiles in styrene, available from Ashland Chemical Company
[2]Saturated polyester/urethane low profile additive, 40% NV in styrene, available from Ashland Chemical Company
[3]A 11% dispersion of MgO in a low acid value UPE unsaturated polyester carrier Review of Example 11 shows that superior surface quality is achieved with the capped oligomer adduct surface quality enhancer of the invention. An Ashland Index of 60 is premium Class A automobile part quality.

The following Example 12 illustrates use of a cyclic acid to cap a polyester oligomer to form the polycapped oligomer adduct surface quality enhancer of this invention.

EXAMPLE 12
Rosin (Resin Acids) Capped Surcace Quality Oligomer Adduct

| Preparation: Charge: Component | Grams |
|---|---|
| Adipic Acid/Diethylene Glycol Polyester Oligomer, [OH] value = 141.5 [AV] = 1.3 | 441.4 |
| Rosin [AV] = 168 | 320 |
| Fascat 4100 monohydrated butyl tin oxide catalyst product of M & T Chemicals | 0.38 |

The ingredients were charged to a 1-liter resin kettle. The mixture was lightly purged with nitrogen as it was mixed and heated to about 240° C. Water was removed as the ester was formed. The reaction was continued until the acid value in mg/g of sample was reduced to about 7.6. The product was dissolved in styrene inhibited with 100 ppm of tertiary butyl-catechol to 80 percent nonvolatiles.

| Testing the Effectiveness of the Rosin Acid Additive | | |
|---|---|---|
| Component | Control (phr) | w/Additive (phr) |
| AROPOL Q6585[1] | 72.0 | 72.2 |
| LPA, Uralloy LP2020[2] | 21.2 | 21.2 |
| Styrene | 6.8 | 3.2 |
| Rosin Capped Adduct | 0 | 3.2 |
| Cobalt Naphthanate (12% Co Metal) | 0.1 | 0.1 |
| Tert-Butyl Hydroxytoluene (inhibitor) | 0.1 | 0.1 |
| Tert-Butyl Peroxybenzoate (initiator) | 1.5 | 1.5 |
| Calcium Carbonate filler | 200.0 | 200.0 |
| MgO Thickener[3] | 3.5 | 3.5 |
| Ashland Index | 100 | 83 |

[1]Amorphous unsaturated polyester resin (propylene glycol and maleic acid), acid value 28 to 32, 65% non-volatiles in styrene, available from Ashland Chemical Company
[2]Saturated polyester/urethane low profile additive, 50% NV in styrene, available from Ashland Chemical Company
[3]a 33% MgO dispersion in a low acid value on unsaturated polyester carrier Review of Example 12 shows that a cyclic end group can be used to react with a polyester polyol to form an effective polycapped oligomer adduct surface quality enhancer.

Ambient Temperature Molding with ADDUCT B

Good control of shrinkage during cure is critical to obtaining a smooth, well formed surface on parts molded from thermosetting resins. It does not matter whether the part is molded at ambient temperature or at elevated temperature. Thermoplastic low profile additives have historically been used to control cure shrinkage in unsaturated polyester resins. Unfortunately, addition of these low profile additives often slows and/or reduces the degree of cure for the resin system. Therefore, lower levels of low profile additives are advantageous. The formulations shown in Example 13 demonstrate the advantage of using ADDUCT B in ambient curing systems.

EXAMPLE 13

| Components | (phr) | (phr) |
|---|---|---|
| AROPOL Q6585[1] | 34.9 | 30.0 |
| AROPOL 8014[2] | 11.6 | 10.0 |
| AROPOL 2036[3] | 15.0 | 23.0 |
| LPA, URALLOY L[4] | 10.0 | 7.0 |
| LPA, AROPOL Q8000[5] | 10.0 | 7.0 |
| ADDUCT B | 0 | 4.0 |
| Styrene | 8.9 | 12.5 |
| Methyl Methacrylate Monomer | 4.0 | 4.0 |
| Fumed Silica | 0 | 0.7 |
| Tween 20 Surfactant | 0 | 0.2 |
| Tetrahydroquinine | 0.2 | 0.04 |
| Cobalt Naphthanate (12% cobalt metal) | 0.4 | 0.4 |
| Dimethylanaline | 0.2 | 0.2 |
| Potassium octoate (15% potassium) | 0.2 | 0.1 |
| Dimethyl para toluidine | 0.1 | 0.05 |
| Lupersol DDM9 | 2.0 | 1.25 |
| Peak Temperature, of | 340° F. | 362° F. |
| ambient cup gel | 171° C. | 183° C. |
| Performance: | | |
| cup gel | visible shrinkage of cup gel resin | visible expansion of cup gel resin |
| cure | poor cure | good, hard cure |
| part appearance | glass print on part | smooth glossy surface on the part |

[1]Amorphous unsaturated polyester resin (propylene glycol and maleic acid), acid value 28 to 32, 65% non-volatiles in styrene, available from Ashland Chemical Company
[2]72–75% nonvolatiles in styrene, acid value 18–35, stokes viscosity 10–12
[3]Unsaturated polyester base resin, from maleic anhydride/isophthalic acid/diethylene glycol/ethylene glycol at 58/42/80/20 molar percents
[4]Saturated polyester/urethane low profile additive, 50% nonvolatiles in styrene, available from Ashland Chemical Company
[5]Saturated polyester low profile additive at 50% nonvolatiles, Ashland Chemical Company phr=parts per 100 parts of resin, where resin typically includes unsaturated (reactive) resin(s), saturated resin(s), and reactive monomers.

Example 13 molding was done in an unheated mold at ambient temperatures while in Examples 1–5 the crystalline resin based systems were molded at 194° F. (90° C.) and in Examples 6–9, 11 and 12 the systems were molded at 300° F. (150° C.).

We claim:

1. A resin composition for further reaction to form cured thermoset molded articles, comprising:
   (a) an unsaturated polyester,
   (b) a thermoplastic low profile additive for improving surface quality of said molded article selected from saturated polyesters, urethane linked saturated polyesters, acrylate copolymers, methacrylate copolymers, styrene-butadiene copolymers, or mixtures thereof,
   (c) one or more olefinically unsaturated monomers which copolymerize with the unsaturated polyester, and
   (d) a polycapped oligomer adduct which enhances the performance of component (b) and is incompatible with the curing unsaturated polyester and monomer, said polycapped oligomer adduct made by reacting saturated or unsaturated acids having 8 to 22 carbon atoms with a polyfunctional oligomer selected from a polyether polyol, an epoxy ethoxylated or propoxylated bisphenol A, an ethoxylated or propoxylated phenol-aldehyde reaction product, a polyester polyol, a polyurethane polyol, or mixtures thereof.

2. The composition of claim 1 wherein unsaturated monomer (c) is styrene.

3. The composition of claim 1 wherein said polyester polyol was formed by the glycolysis of polyethylene terephthalate with diethylene glycol.

4. The composition of claim 1 wherein said unsaturated polyester is amorphous.

5. The composition of claim 1 wherein said unsaturated polyester comprises a mixture of a crystalline polyester and an amorphous polyester.

6. The composition of claim 1 wherein said acid is 2-ethylhexanoic, capric, caprylic, lauric, myristic, palmitic, palmitoleic, stearic, isostearic, oleic, linoleic, linolenic, ricinoleic, tall oil, tallow oil, rosin acid, or mixtures thereof.

7. The composition of claim 1 wherein said acid is tall oil fatty acid.

8. The composition of claim 1 wherein said polyfunctional oligomer has a number average molecular weight up to 2000.

9. The composition of claim 8 wherein said weight is less than 1200.

10. The composition of claim 1 wherein (d) is made by reacting tall oil acid with a polyester polyol having a number average molecular weight lower than 800.

11. The composition of claim 1 wherein said polyester polyol is prepared by reacting adipic acid and diethylene glycol.

12. The composition of claim 1 wherein (d) is made by reacting tall oil acid with a polyester polyol having a number average molecular weight lower than 800.

13. The composition of claim 1 wherein said polyfunctional oligomer is at least dicapped.

14. A resin composition for further reaction to form cured thermoset molded articles, comprising:
   (a) an unsaturated polyester,
   (b) a thermoplastic low profile additive for improving surface quality of said molded article selected from saturated polyesters, polyvinyl acetate, polyvinyl acetate copolymers, urethane linked saturated polyesters, acrylate copolymers, styrene-butadiene copolymers, or mixtures thereof,
   (c) one or more olefinically unsaturated monomers which copolymerize with the unsaturated polyester, and
   (d) a polycapped oligomer adduct which enhances the performance of component (b), and is incompatible with the curing unsaturated polyester and monomer, said polycapped oligomer adduct made by reacting saturated or unsaturated acids having 8 to 22 carbon atoms with a polyfunctional oligomer selected from an epoxy, ethoxylated or propoxylated phenol-aldehyde reaction product, a polyester polyol, a polyurethane polyol, or mixtures thereof.

15. The composition of claim 14 wherein said polyester polyol was formed by the glycolysis of polyethylene terephthalate with diethylene glycol.

16. The composition of claim 14 wherein unsaturated monomer (c) is styrene.

17. The composition of claim 14 where said unsaturated polyester is amorphous.

18. The composition of claim 14 wherein said unsaturated polyester comprises a mixture of a crystalline polyester and an amorphous polyester.

19. The composition of claim 14 wherein said acid is 2-ethylhexanoic, capric, caprylic, lauric, myristic, palmitic, palmitoleic, stearic, isostearic, oleic, linoleic, linolenic, ricinoleic, tall oil, tallow oil, rosin acid, or mixtures thereof.

20. The composition of claim 14 wherein said acid is tall oil fatty acid.

21. The composition of claim 14 wherein said polyfunctional oligomer has a number average molecular weight up to 2000.

22. The composition of claim 21 wherein said weight is less than 1200.

23. The composition of claim 14 wherein (d) is made by reacting tall oil acid with a polyester polyol having a number average molecular weight lower than 800.

24. The composition of claim 14 wherein said polyester polyol is prepared by reacting adipic acid and diethylene glycol.

25. The composition of claim 14 wherein (d) is made by reacting tall oil acid with a polyester polyol having a number average molecular weight lower than 800.

26. The composition of claim 14 wherein said polyfunctional oligomer is at least dicapped.

* * * * *